US008730835B2

(12) United States Patent
Karaoguz et al.

(10) Patent No.: US 8,730,835 B2
(45) Date of Patent: *May 20, 2014

(54) MULTI-DIMENSIONAL RESOURCE MANAGEMENT IN A WIRELESS NETWORK

(75) Inventors: Jeyhan Karaoguz, Irvine, CA (US);
Nambirajan Seshadri, Irvine, CA (US);
Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/470,772

(22) Filed: May 22, 2009

(65) Prior Publication Data
US 2010/0296401 A1 Nov. 25, 2010

(51) Int. Cl.
*H04L 12/28* (2006.01)
(52) U.S. Cl.
USPC .......................................................... 370/254
(58) Field of Classification Search
USPC ......... 370/252, 254, 329, 330, 341, 458, 436, 370/431, 437, 441, 442; 709/226, 229; 455/450, 451, 452.1, 452.2, 453, 454
See application file for complete search history.

(56) References Cited

U.S. PATENT DOCUMENTS

| | | | | |
|---|---|---|---|---|
| 2006/0023661 | A1* | 2/2006 | Bennett | 370/328 |
| 2009/0253421 | A1* | 10/2009 | Camp et al. | 455/418 |
| 2009/0316649 | A1* | 12/2009 | Chen | 370/331 |
| 2010/0113006 | A1* | 5/2010 | Pajjuri et al. | 455/423 |
| 2010/0118842 | A1* | 5/2010 | Kalhan | 370/338 |
| 2010/0189084 | A1* | 7/2010 | Chen et al. | 370/338 |
| 2010/0246482 | A1* | 9/2010 | Erceg et al. | 370/328 |
| 2010/0246483 | A1* | 9/2010 | Erceg et al. | 370/328 |
| 2010/0254357 | A1* | 10/2010 | Abraham et al. | 370/338 |

\* cited by examiner

*Primary Examiner* — Mark Rinehart
*Assistant Examiner* — Peter Cheng
(74) *Attorney, Agent, or Firm* — Garlick & Markison; Kevin L. Smith

(57) ABSTRACT

A communication system may include a plurality of entities comprising a hybrid network controller, one or more femtocells, one or more access points and/or one or more end-point devices. The hybrid network controller may determine and/or communicate configuration parameters corresponding to space, time, frequency and/or code domains that may enable communication of data between and/or among two or more of the entities. The configuration parameters may comprise frequency, time slot, codes and/or antenna pattern assignments. The network controller may control communication between a communication device external to the communication system and one or more of the entities within the communication system. Availability of frequencies, time slots, codes and/or antenna patterns may be monitored. The network controller may assign the femtocells, access points and/or end-point devices to handle the communication of the data. The hybrid network controller may communicate with the plurality of entities via wired, optical and/or wireless interfaces.

20 Claims, 7 Drawing Sheets

MULTI-DIMENSIONAL RESOURCE MANAGEMENT IN A WIRELESS NETWORK

CROSS-REFERENCE TO RELATED APPLICATIONS/INCORPORATION BY REFERENCE

This patent application makes reference to:
U.S. patent application Ser. No. 12/470,764 filed on May 22, 2009;
U.S. patent application Ser. No. 12/470,826 filed on May 22, 2009;
U.S. patent application Ser. No. 12/470,997 filed on May 22, 2009; and
U.S. patent application Ser. No. 12/470,983 filed on May 22, 2009.

Each of the above stated applications is hereby incorporated herein by reference in its entirety.

FIELD OF THE INVENTION

Certain embodiments of the invention relate to communications. More specifically, certain embodiments of the invention relate to a method and system for multi-dimensional resource management in a wireless network.

BACKGROUND OF THE INVENTION

A femtocell may be placed in a customer's residence or in a small business environment, for example. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

An important characteristic of femtocells is their ability to control access. In an open access scenario, any terminal and/or subscriber may be allowed to communicate with the femtocell. Accordingly, the femtocell usage may somewhat resemble that of a macrocell system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a low power in a controlled environment. It may be likely that they may not require a license from a local authority, as macrocell base stations do. An additional regulatory issue may arise from the relationship between a femtocell operator and a broadband services operator. The broadband operator and femtocell operator may have an agreement or they may be the same operator, for example. There may even be instances when a broadband operator may be unaware of the existence of a femtocell operator. Interference between femtocells may be an issue for femtocell deployments based on wideband technologies such as WCDMA, for example, because initial operator deployments may use the same frequency for both the femtocell and the macrocell networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

An access point is a device that may be placed in a customer's residence or in a small business environment and provide WLAN or WiFi service. An access point may be enabled to connect an endpoint device such as a computer or handheld wireless device to an intranet or an internet service provider (ISP) via a physical broadband connection which may be a digital subscriber line (DSL) connection and/or a cable connection, for example. Access points may communicate over-the-air based on one or more 802.11 standards. Moreover, access points may be attached to an Enterprise network to allow users to access a corporate intranet.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for multi-dimensional resource management in a wireless network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multi-dimensional resource management in a wireless network. In various embodiments of the invention, a communication system may comprise a hybrid network controller, one or more femtocells, one or more access points and/or one or more end-point devices. The femtocells and/or access points may comprise 2G, 3G and/or 4G technology. For example, the access points may comprise WLAN access points, LTE access points and/or WiMax access points. The hybrid network controller may be operable to determine configuration parameters corresponding to space, time, frequency and/or code domains that may enable communication of data between and/or among two or more of the femtocells, the access points and/or the end-point devices. In addition, the hybrid network controller may be enabled to communicate the determined configuration parameters to the femtocells, the access points and/or the end-point devices for enabling the communication. The configuration parameters corresponding to the space, time, frequency and/or code domains may comprise one or more of frequency assignments, time slot assignments, code assignments and/or antenna pattern assignments for example. Moreover, the hybrid network controller may be operable to control the communication of the data between a communication device external to the communication system and the one or more femtocells, the one or more access points and/or the one or more end-point devices.

Availability of frequencies, time slots, codes and/or antenna patterns of the one or more femtocells, the one or more access points and/or the one or more end-point devices may be monitored by the hybrid network controller. The hybrid network controller may allocate and/or assign one or more frequencies, one or more time slots, one or more codes and/or one or more antenna patterns for the communication of the data, based on the configuration parameters. Moreover, the hybrid network controller may assign one or more of the femtocells, the access points and/or the end-point devices to handle the communication of the data. The hybrid network controller may communicate information for controlling the communication parameters with the femtocells, the access points and/or the end-point devices via one or more of wired, optical and/or wireless interfaces.

Figure 1A:
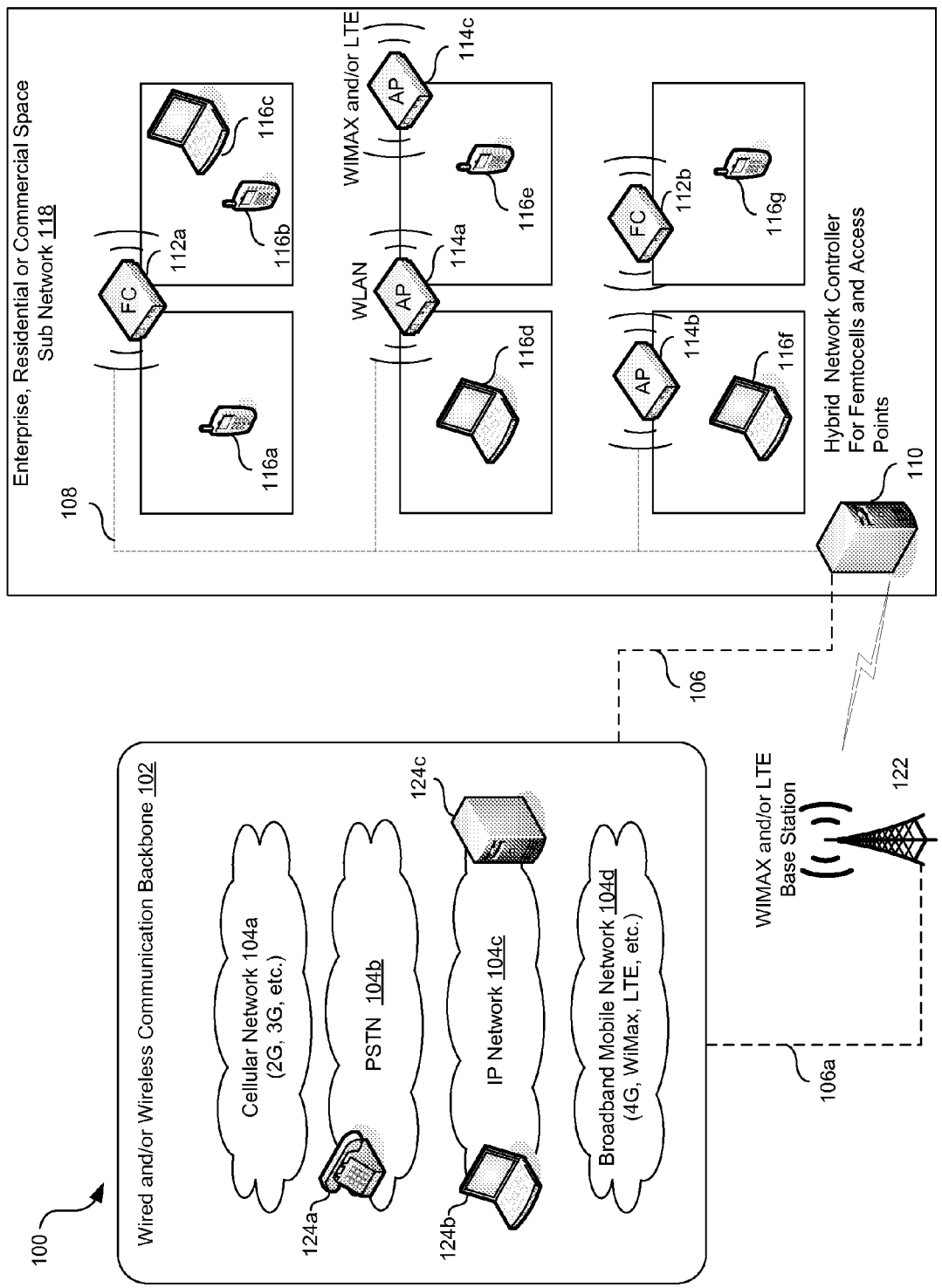
FIG. 1A is a diagram illustrating an exemplary hybrid network comprising a network controller, femtocells, access points and/or user equipment, in accordance with an embodiment of the invention.

FIG. 1A is a diagram illustrating an exemplary hybrid network comprising a hybrid network controller, femtocells, access points and/or user equipment, in accordance with an embodiment of the invention. Referring to FIG. 1A, there is shown a system of networks 100 comprising the wired and/or wireless communication backbone 102 which comprises a cellular network 104a, a public switched telephone network 104b, a IP network 104c, a broadband mobile network 104d, the WIMAX and/or LTE base station 122, the telephone 124a, the laptop 124b, the application server 124c and a hybrid sub-network 118. The hybrid sub-network 118 comprises a hybrid network controller 110, a plurality of femtocells 112a and 112b that are collectively referred to herein as femtocells 112, a plurality of access points (AP) 114a, 114b and 114c that are collectively referred to herein as APs 114, and a plurality of end user equipment (UE) 116a, . . . , 116g that are collectively referred to herein as UEs 116. In addition, the hybrid sub-network 118 comprises a wired and/or wireless connection 108 and an Ethernet, WiMax and/or LTE broad band link 106.

The hybrid sub-network 118 may comprise a hybrid network controller 110, user equipment (UE) 116a, . . . , 116g, femtocells 112a and 112b and/or access points (AP) 114a and 114b that may be installed in an enterprise system, commercial properties, residential properties and/or multi-tenant properties for example. The enterprise system may be deployed in office buildings, schools, hospitals or government buildings for example. The commercial properties may comprise, for example, stores, restaurants and/or offices. The residential properties may comprise, for example, single-family homes, home offices, and/or town-houses. Multi-tenant properties may comprise residential and/or commercial tenants such as apartments, condos, hotels, and/or high rises. In various embodiments of the invention, the hybrid sub-network 118 may be controlled by the hybrid network controller 110. In addition, all or a portion of the hybrid sub-network 118 may be managed by a service provider which licenses cellular frequencies utilized by the hybrid network controller 110 and/or femtocells 112.

The hybrid network controller 110 comprises suitable logic, circuitry, interfaces and/or code that may be operable to control and/or manage communication among the UEs 116, the femtocells 112 and/or the APs 114. In this regard, the hybrid network controller 110 may be operable to control resources within the hybrid sub-network 118. For example, the hybrid network controller 110 may be operable to assign the femtocells 112 and/or the APs 114 to handle calls and or sessions for the UEs 116. Moreover, the hybrid network controller 110 may allocate resources and/or control parameters of communication for femtocells 112, APs 114 and/or UEs 116. In this regard, the hybrid network controller 110 may determine which femtocells 112 and/or APs 114 may handle calls and/or sessions with the various UEs 116 based on signal propagation, signal quality constraints, available transmission frequencies, available access time and/or available code assignments in light of UE 116 traffic constraints. In addition, the hybrid network controller 110 may modify and/or assign antenna beam forming patterns, frequencies, access time slots and/or codes to the femtocells and/or APs. In this manner the hybrid network controller 110 may improve performance metrics, reduce power consumption, improve spectral efficiency and/or reduce costs. In various embodiments of the invention, the hybrid network controller 110 may receive control information from a service provider network. For example from an RNC that may control base stations near the hybrid sub-network 118.

The hybrid network controller 110 may be communicatively coupled to the femtocells 112 and/or the APs 114 via a wired and/or wireless connection 108. In this regard, the connection 108 may support Ethernet, WLAN and/or cellular connectivity. In addition, the hybrid network controller 110 may be communicatively coupled to the wired and/or wireless communication backbone 102 via the Ethernet, WiMax and/or LTE broad band link 106. For example, the hybrid network controller 110 may communicate with one or more of the networks 104 via the Ethernet, WiMax and/or LTE broad band link 106, for example.

The femtocells 112 may each comprise suitable logic, circuitry, and/or code that may be operable to communicate wirelessly with the UEs 116 utilizing one or more cellular standards comprising IS-95, CDMA, GSM, TDMA, GPRS, EDGE, UMTS/WCDMA, TD-SCDMA, HSDPA, extensions thereto, and/or variants thereof. Data comprises any analog and/or digital information including but not limited to voice, Internet data, and/or multimedia content. Multimedia content may comprise audio and/or visual content comprising, video, still images, animated images, and/or textual content. The femtocells 112 may each communicate with various devices such as the UEs 116. Exemplary cellular standards supported by the femtocells 112 may be specified in the International Mobile Telecommunications-2000 (IMT-2000) standard and/or developed by the 3rd generation partnership project (3GPP), the 3rd generation partnership project 2 (3GPP2) and/or fourth generation specifications.

The femtocells 112 may each comprise suitable logic, circuitry, and/or code that may be operable to communicate utilizing IP protocol over a wired or wireless connection 108 with the hybrid network controller 110. In various embodiments of the invention, the femtocells 112 may comprise suitable logic, circuitry and/or code that are operable to receive and/or process control information from the hybrid network controller 110. In this regard, the control information may comprise various parameter settings, resource allocation and/or configuration information for enabling communication between the femtocell 112 and the UEs 116. In addition, the femtocells 112 may be operable to provide information to the hybrid network controller 110 that may be utilized to determine the control information.

The APs 114 comprise suitable logic, circuitry and/or code that may be operable to provide WLAN, WiFi, LTE and/or WiMax connectivity to one or more of the UEs 116 based on one or more 802.11 and/or 802.16 standards, for example. In this regard, the APs 114 may provide Internet connectivity, multimedia downloads and/or IP telephony sessions to the UEs 116. The APs 114 may be managed by the hybrid network controller 110 via the wired and/or wireless connection 108. A plurality of APs 114 may be operable to support simultaneous sessions and/or handoffs of a single UE 116. In addition, one or more APs 114 may be operable to support simultaneous sessions and/or handoffs for a single UE 116 with one or more femtocells 112. In various embodiments of the invention, the APs 114 may be operable to support handoff or simultaneous sessions of a single UE 116 with an AP in another sub-network (not shown). In various embodiments of the invention, the APs 114 may comprise suitable logic, circuitry and/or code that may be operable to receive and/or process control information from the hybrid network controller 110. In this regard, the control information may comprise various parameter settings, resource allocation and/or configuration information for enabling communication between the APs 114 and the UEs 116. In addition, the APs 114 may be operable to provide information to the hybrid network controller 110 that may support determination of the control information.

The user equipment (UE) 116 may each comprise suitable logic, circuitry, and/or code that may be operable to communicate utilizing one or more wireless standards. For example, the UEs 116 may be operable to communicate with the APs 114 based on 802.11 standards and/or variants thereof. In addition, the UEs 116 may be operable to communicate with the femtocells 112 based on one or more wireless standards such as IS-95, CDMA, EVDO, GSM, TDMA, GPRS, EDGE, UMTS/WCDMA, TD-SCDMA, HSDPA, WIMAX and/or LTE. The UEs 116 may be operable to communicate based on Bluetooth, Zigbee and/or other suitable wireless technologies. The UEs 116 may each be operable to transmit and/or receive data to and/or from the femtocells 112 and/or APs 114 in the hybrid sub-network 118 as well as with other cellular base stations and/or APs. Exemplary UEs 116 may comprise laptop computers, mobile phones, media players, HD television systems, video and/or still cameras, game consoles and/or location determination enabled devices. The UEs 116 may be enabled to receive, process, and/or present multimedia content and may additionally be enabled to run a web browser or other applications for providing Internet services to a user of the UE 116.

In various embodiments of the invention, the UE 116 devices may be multimode devices that may be operable to communicate simultaneously with a plurality of femtocells 112 and/or APs 114. For example, the UE 116b may be enabled to communicate simultaneously with the femtocell 112a and the AP 114a. Alternatively, the UE 116 devices may be enabled to communicate simultaneously with a plurality of femtocells 112 and/or simultaneously with a plurality of APs 114. Moreover, the UE 116 devices may be operable to perform handoffs, for example, between multiple femtocells 112, between femtocells 112 and APs 114 and/or between multiple APs 114. The UEs 116 may comprise suitable logic, circuitry and/or code that may be operable to receive and/or process control information from the hybrid network controller 110. In this regard, the control information may comprise various parameter settings, resource allocation and/or configuration information for enabling communication between the UEs 116, the femtocells 112 and/or the APs 114. In addition, the UEs 116 may be operable to provide information to the hybrid network controller 110 that may be utilized to determine the control information.

The wired and/or wireless communication backbone 102 may comprise suitable logic, circuitry and/or code that may be operable to provide access to a plurality of networks, for example, the cellular network 104*a*, the public switched telephone network (PSTN) 104*b*, the IP network 104*c* and/or the broadband mobile network 104*d*. The cellular network 104*a* may comprise 2G and/or 3G networks, for example. The broadband mobile network 104*d* may comprise 4G networks, for example, WiMax and/or LTE networks. The wired and/or wireless communication backbone 102 and/or the networks 104 may comprise various endpoint and/or user equipment devices. For example, the telephone 124*a* may be communicatively coupled to the PSTN 104*b*. In addition, the laptop 124*b* and/or the application server 124*c* may be communicatively coupled to the IP network 104*c*. In this regard, the telephone 124*a*, the laptop 124*b* and/or the application server 124*c* may be accessible to devices within the hybrid sub-network 118 via the wired and/or wireless communication backbone 102. For example, a UE 116*c* may receive a phone call from a remote landline telephone 124*a* that is located within the PSTN network 104*b*.

In addition, the wired and/or wireless backbone 102 may be communicatively coupled to other sub-networks and/or private intranets (not shown) for example. In this manner, the wired and/or wireless communication backbone 102 may enable the UEs 116 to communicate with remote resources such as other user equipment, an application server on the Internet and other network devices that may be communicatively coupled via the networks 104 for example. The wired and/or wireless backbone 102 may be communicatively coupled to the hybrid network controller 110 via the Ethernet, WiMax and/or LTE broad band link 106. Although the Ethernet, WiMax and/or LTE broadband link 106 is shown in FIG. 1, the invention is not so limited. For example, the broadband link 106 may comprise other types of links such as ATM or Frame Relay for example.

In operation, the hybrid network controller 110 may manage communication between the UEs 116 and one or more femtocells 112 and/or APs 114. In this regard, the UEs 116 may gain access to the one or more networks 104 within the wired and/or wireless communication backbone 102 via one or more of the femtocells 112, the APs 114 and/or the hybrid network controller 110. In various embodiments of the invention, the hybrid network controller 110 may receive information regarding various operating conditions and/or resource availability from the APs 114, the femtocells 112 and/or UEs 116 that may be located within the hybrid sub-network 118. Exemplary received information may comprise round trip path delay, received signal strength information, measured interference, bit error rates, bandwidth availability, frequency, code and/or time slot utilization, antenna configurations, antenna beam forming patterns, software configuration and/or maximum transmit power. In various embodiments of the invention, global navigation satellite system (GNSS) timing and/or location coordinates for one or more of the femtocells 112, the APs 114 and/or the UEs 116 may be received.

The UE 116 may initiate and/or receive a request for a call and/or session with another UE device and/or with a network resource within the wired and/or wireless communication backbone 102 for example. The hybrid network controller 110 may utilize the received information to determine which femtocells 112 and/or APs 114 may qualify to serve the call and/or session. The determination may be based on one or more of signal propagation areas, signal quality measurements, available transmission frequencies, available access time slots and/or available pseudo noise (PN) codes. Moreover, the hybrid network controller 110 may be operable to select one or more femtocells 112 and/or APs 114 to serve the call and/or session and may allocate resources and/or communicate control parameters for the selected femtocells 112 and/or APs 114. For example, the hybrid network controller 110 may assign and/or modify beam forming parameters, frequencies, access time slots and/or PN codes to the selected femtocells 112, APs 114 and/or the target UE 116. In this manner, the hybrid network controller 110 may manage the call and/or communication session between the one or more femtocells 112 and/or the APs 114 and the UE 116. The hybrid network controller 110 may exchange information with a service provider, for example, with an RNC, and may manage the call and/or communication session based on control information received from the service provider.

Figure 1B:
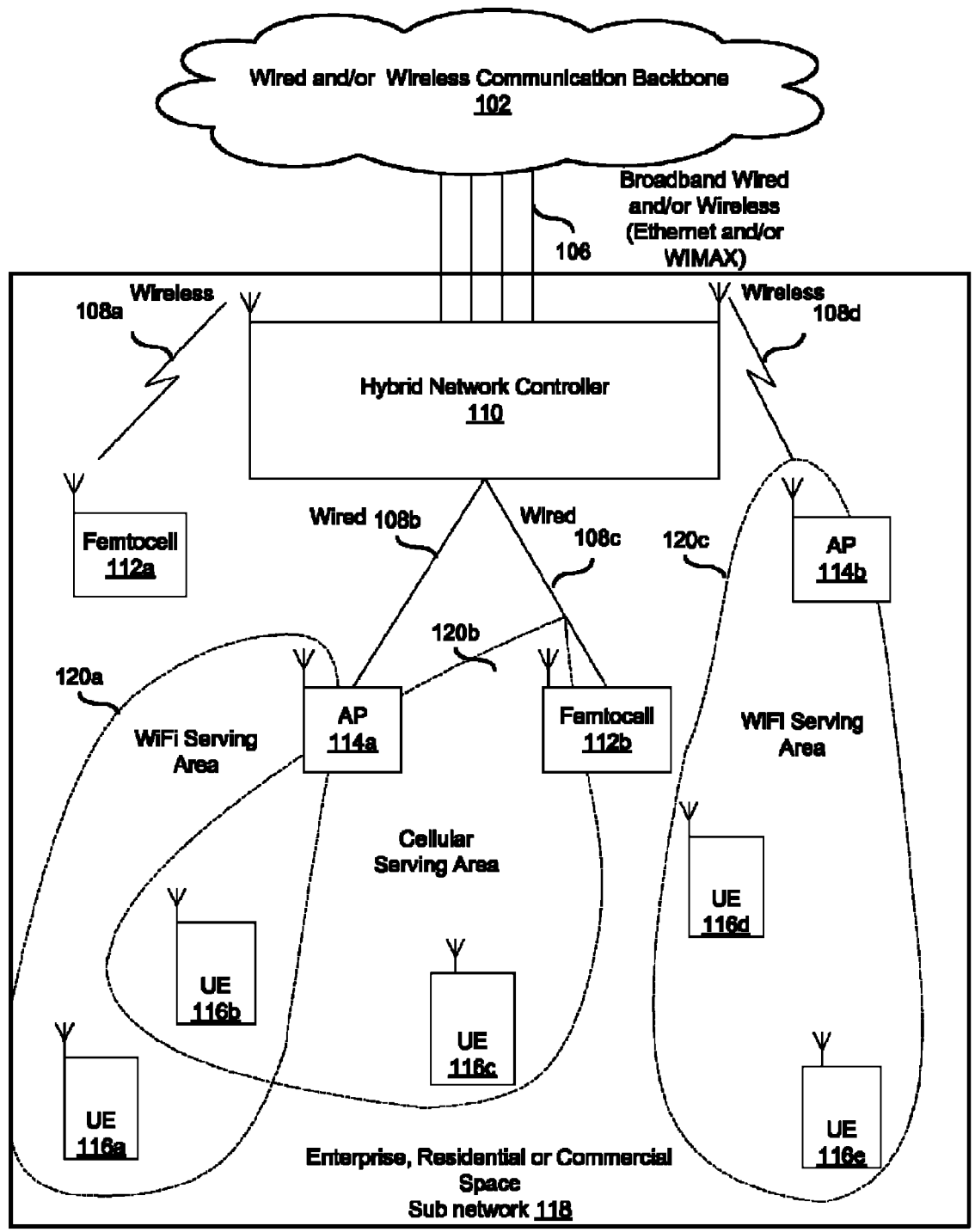
FIG. 1B is a block diagram illustrating an exemplary hybrid network controller that may be operable to handle multidimensional resource management among one or more femtocells, access points and user equipment, in accordance with an embodiment of the invention.

FIG. 1B is a block diagram illustrating an exemplary hybrid network controller that may be operable to handle multidimensional resource management among one or more femtocells, access points and user equipment, in accordance with an embodiment of the invention. Referring to FIG. 1B, there is shown the wired and/or wireless communication backbone 102, the Ethernet, WiMax and/or LTE broad band link 106, the wired and/or wireless connections 108, the hybrid network controller 110, the femtocells 112*a* and 112*b*, the access points (APs) 114*a* and 114*b*, the user equipment (UE) 116*a*, . . . , 116*e*, WiFi serving areas 120*a* and 120*c*, a femtocell serving area 120*b* and the hybrid sub-network 118.

The wired and/or wireless communication backbone 102, the Ethernet, WiMax and/or LTE broad band link 106, the wired and/or wireless connection 108, the hybrid network controller 110, the femtocells 112*a* and 112*b*, the access points (APs) 114*a* and 114*b*, the user equipment (UE) 116*a*, . . . , 116*e* and the hybrid sub-network 118 are described with respect to FIG. 1A.

The Ethernet, WiMax and/or LTE broad band link 106 comprises suitable logic circuitry and/or code that is operable to carry traffic for the femtocells 112 and the APs 114 to and/or from the wired and/or wireless communication backbone 102. For example, the Ethernet, WiMax and/or LTE broad band link 106 may transport IP packets to one or more of the networks 104 described with respect to FIG. 1A. In addition, the Ethernet, WiMax and/or LTE broad band link 106 may provide access to the Internet and/or one or more private networks. The Ethernet, WiMax and/or LTE broad band link 106 may comprise one or more of optical, wired, and/or wireless links. In various embodiments of the invention, the Ethernet, WiMax and/or LTE broad band link 106 may comprise a WIMAX and/or LTE base station 122 and the hybrid network controller 110 may communicate with the networks 104 via the WIMAX and/or LTE base station 122 and the broadband mobile network 104*d*. In various embodiments of the invention, the Ethernet, WiMax and/or LTE broad band link 106 may comprise a broadband connection such as a digital subscriber line (DSL), Ethernet, passive optical network (PON), a T1/E1 line, a cable television infrastructure, a satellite television infrastructure, and/or a satellite broadband Internet connection.

With reference to FIG. 1B, the area shown as the femtocell serving area 120*b* illustrates that the femtocell 112*b* may handle cellular calls and/or communication sessions with the UE 116*b* and the UE 116*c*. In a similar manner, area shown as the WiFi serving area 120*a* illustrates that the AP 114*a* may handle calls and/or communication sessions with UE 116*a* and 116*b*. The area shown as the WiFi serving area 120*c* illustrates that the AP 114*b* may handle calls and/or communication sessions with the UE 116*d* and the UE 116*e*. The hybrid network controller 110 may be operable to control which femtocells 112 and/or APs 114 handle calls and/or communication sessions with the various UEs 116. By controlling femtocell and/or AP serving areas, the hybrid network controller 110 may balance traffic and/or improve performance metrics within and/or near the hybrid sub-network 118.

In operation, the hybrid network controller 110 may be operable to provide multidimensional resource management to the hybrid sub-network 118. For example, the hybrid network controller 110 may manage multidimensional communication parameters in space, time, frequency and/or code domains for the femtocells 112, the APs 114 and/or the UEs 116. The multidimensional communication parameters in space, time, frequency and/or code domains may comprise antenna beam forming parameters, frequency assignments, time slot assignments and/or pseudo-noise (PN) code assignments, for example. In this regard, antenna parameters may comprise coefficients that may modify antenna radiation patterns in order to improve signal quality and/or to shape a serving area for a femtocell 112 or AP 114. Frequency parameters may comprise carrier frequencies on a forward and/or a reverse link between a femtocell 112 and/or AP 114 and an UE 116, for example, for frequency division multiple access (FDMA), frequency hopping and/or orthogonal frequency division multiplexing (OFDM). Time slot assignments may coordinate at what time instant a femtocell 112 and/or AP 114 may transmit a signal and/or at what time an UE 116 may receive the signal and vice versa. PN code assignments may comprise orthogonal code assignments, for example, Walsh codes that may identify a call and/or a session, PN codes that may be utilized for direct sequence spreading and may establish a chip rate, for example, PN short codes, PN codes that may be utilized for scrambling a signal, for example, PN long codes and/or PN code offset assignments, for example. In this manner, the hybrid network controller 110 may be operable to manage interference and/or balance UE 116 traffic for the hybrid sub-network 118. The hybrid network controller 110 may be operable to respond to dynamic conditions in a radio environment and/or respond to UE 116 traffic patterns. Accordingly, improvements in capacity and/or performance may be realized for the hybrid sub-network 118. The hybrid network controller 110 may be operable to exchange control information with the various femtocells 112, the APs 114 and/or the UEs 116 via the wired and/or wireless connections 108.

Figure 1C:
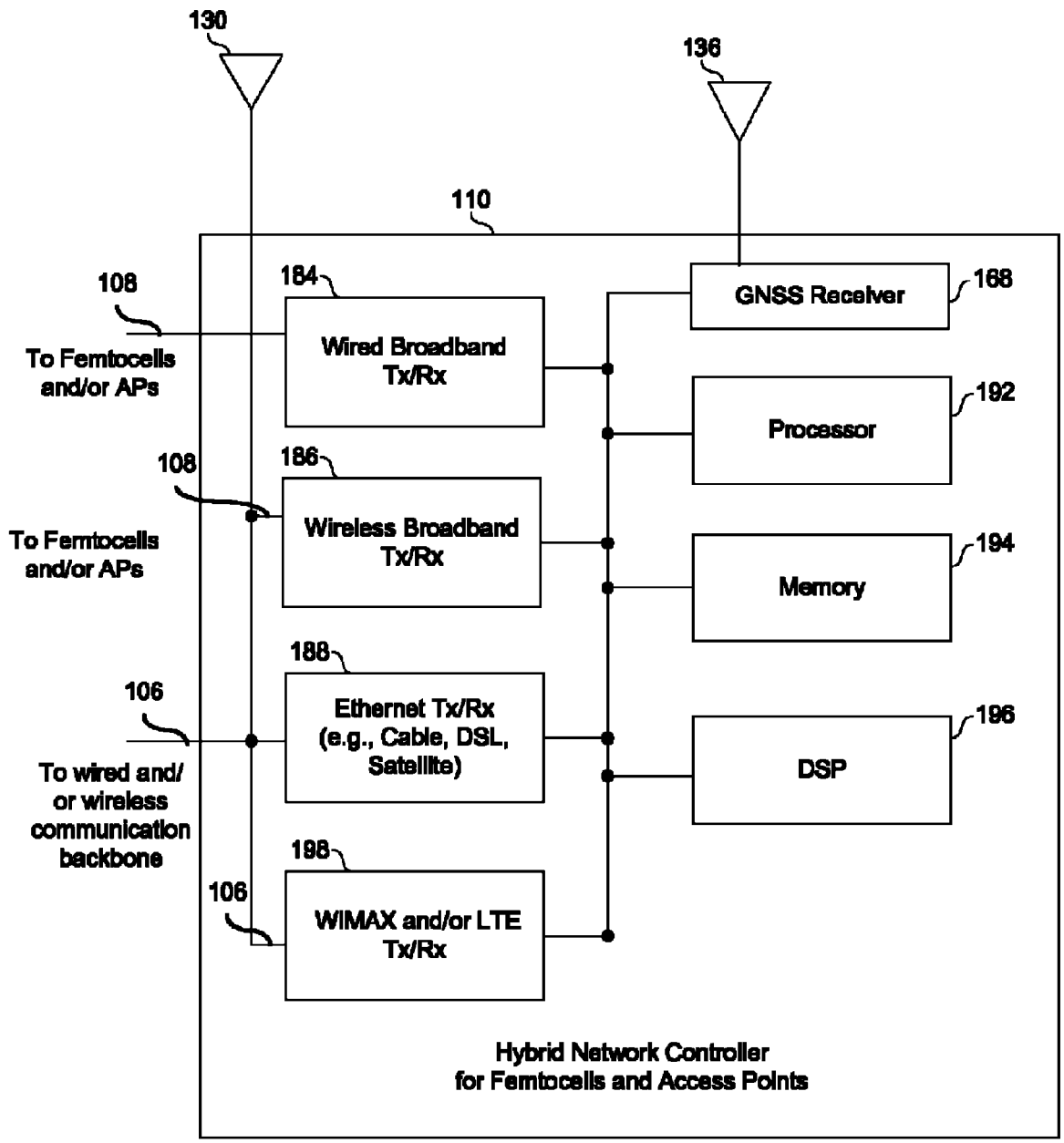
FIG. 1C is a block diagram of an exemplary hybrid network controller, in accordance with an embodiment of the invention.

FIG. 1C is a block diagram of an exemplary hybrid network controller, in accordance with an embodiment of the invention. Referring to FIG. 1C, there is shown, the hybrid network controller 110 that may comprise a wired broadband Tx/Rx 184, a wireless broadband Tx/Rx 186, an Ethernet Tx/Rx 188, a WIMAX and/or LTE Tx/Rx 198, a GNSS receiver 168, a GNSS antenna 136, a processor 192, a memory 194 and a DSP 196.

The Ethernet Tx/Rx 188 may comprise suitable logic, circuitry, and/or code that may be operable to transmit and/or receive data to and/or from the wired and/or wireless communication backbone via the Ethernet, WiMax and/or LTE broad band link 106. For example, the Ethernet Tx/Rx 188 may transmit and/or receive data via a T1/E1 line, PON, DSL, cable television infrastructure, satellite broadband internet connection and/or satellite television infrastructure for example. In various embodiments of the invention, the Ethernet Tx/Rx 188 may be operable to perform exemplary operations and/or functions comprising amplification, down-conversion, filtering, demodulation, and analog to digital conversion of received signals. In addition, the Ethernet Tx/Rx 188 may be operable to perform exemplary operations and/or functions comprising amplification, up-conversion, filtering, modulation, and digital to analog conversion of transmitted signals.

The WiMax and/or LTE Tx/Rx 198 may comprise suitable logic, circuitry, and/or code that may be operable to transmit and/or receive data via the antenna 130 to and/or from the WiMax and/or LTE base station 122 and/or the WiMax and/or LTE broadband mobile network 104d in the wired and/or wireless communication backbone 102. In this regard, the WiMax and/or LTE base station 122 may be utilized for the Ethernet, WiMax and/or LTE broad band link 106. The WiMax and/or LTE Tx/Rx 198 may be operable to perform exemplary operations and/or functions comprising amplification, down-conversion, filtering, demodulation, and analog to digital conversion of received signals. In addition, the WiMax and/or LTE Tx/Rx 198 may be operable to perform amplification, up-conversion, filtering, modulation, and digital to analog conversion of transmitted signals. The WiMax and/or LTE Tx/Rx 198 may be operable to communicate with the WiMax and/or LTE AP 114c.

The wired broadband Tx/Rx 184 and/or the wireless broadband Tx/Rx 186 may comprise suitable logic, circuitry, and/or code that may be operable to transmit and/or receive data in adherence with one or more broadband communication standards to the femtocells 112 and/or APs 114 via the wired and/or wireless connections 108. For example, the hybrid network controller 110 may communicate with the femtocells 112 and/or APs 114 via the wired broadband Tx/Rx 184 and an Ethernet cable in adherence to 802.3 communication standards. Alternatively, the Tx/Rx 186 may communicate via the antenna 130 for example in adherence to 802.11 communication standards. The wired broadband Tx/Rx 184 and/or wireless broadband Tx/Rx 186 may be operable to perform amplification, down-conversion, filtering, demodulation, and analog to digital conversion of received signals. In addition, the broadband Tx/Rx 184 and/or 186 may be operable to perform amplification, up-conversion, filtering, modulation, and digital to analog conversion of transmitted signals.

The antenna 130 may be suitable for transmitting and/or receiving signals to and/or from the wired and/or wireless communication backbone 102 and/or to and/or from the femtocells 112 and/or APs 114. Although a single antenna 130 is illustrated, the invention is not so limited. In this regard, the Tx/Rx 184, Tx/Rx 186, Tx/Rx 188 and/or Tx/Rx 198 may utilize a common antenna for transmission and reception, may utilize different antennas for transmission and reception, and/or may utilize a plurality of antennas for transmission and/or reception. In various embodiments of the invention, the antenna 130 may be operable to perform beamforming and/or comprise a multiple input multiple output (MIMO) antenna system for example.

Figure 1D:
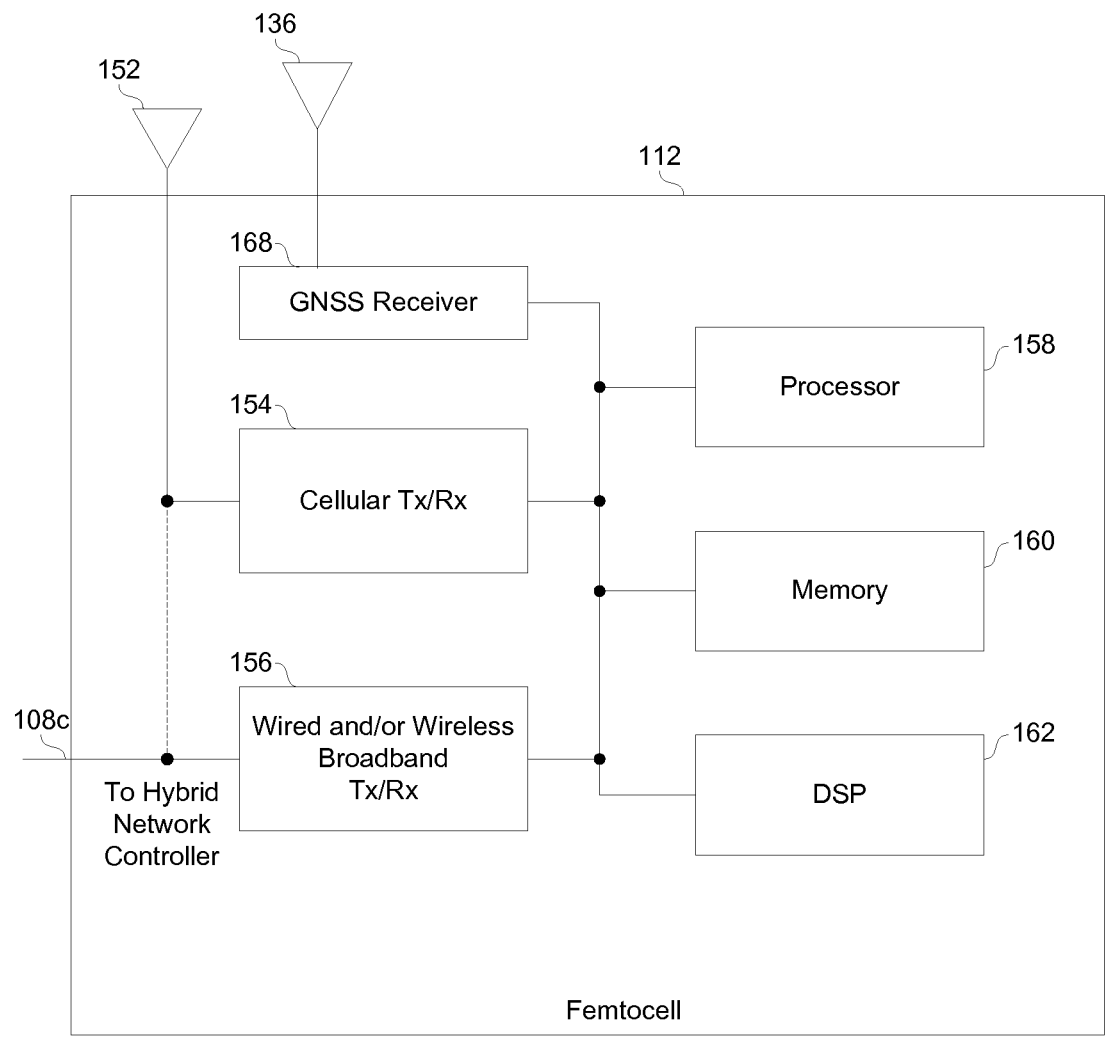
FIG. 1D is a block diagram of an exemplary femtocell, in accordance with an embodiment of the invention.

The GNSS receiver 168 and GNSS antenna 136 may be similar and/or the same as the GNSS receive 168 and GNSS antenna 136 described with respect to FIG. 1D.

The processor 192 may comprise suitable logic, circuitry, and/or code that may enable processing data and/or controlling operations of the hybrid network controller 110. In this regard, the processor 192 may be enabled to provide control signals to the various other blocks within the hybrid network controller 110. The processor 192 may also control data transfers between various portions of the hybrid network controller 110. Additionally, the processor 192 may enable execution of applications programs and/or code. In various embodiments of the invention, the applications, programs, and/or code may enable, for example, parsing, transcoding and/or otherwise processing data.

In various embodiments of the invention, the applications, programs, and/or code may enable, for example, configuring and/or controlling operation of the wired and/or wireless broadband Tx/Rx 184 and/or 186, the Ethernet Tx/Rx 188, the WIMAX and/or LTE Tx/Rx 198, the GNSS receiver 168, the DSP 196, and/or the memory 194. For example, transmission power levels may be configured and/or transmission times may be scheduled.

The processor 192 may be operable to manage communication of data and/or QoS for data communicated via the Ethernet, WiMax and/or LTE broad band link 106, the Ethernet Tx/Rx 188 and/or the WIMAX and/or LTE Tx/Rx 198. In various embodiments of the invention, the processor 192 may send control information to the femtocells 112, the APs 114 and/or the UEs 116. In this regard, the processor 192 may be enabled to control communication between the femtocells 112 the APs 114 and the UEs 116. For example, the processor 192 may determine and communicate control parameters such as antenna weighting patterns, filter coefficients, power level, modulation scheme, error coding scheme, and/or data rates.

The processor 192 may comprise suitable logic, circuitry and/or code that are operable to manage beamforming for antennas within one or more of the femtocells 112 and/or APs 114 that may comprise smart antennas and/or multiple input multiple output (MIMO) systems. In this regard, the processor 192 may receive information from the femtocells 112 and/or APs 114 regarding various RF conditions, current configurations and/or device capabilities. The processor 192 may be operable to generate beamforming parameters for the femtocells 112 and/or APs 114, for example, antenna weight patterns and/or filter coefficients. The beamforming parameters may enable the femtocells 112 and/or APs 114 to focus and/or null, transmit and/or receive antenna radiation patterns in order to improve SNR and/or to control which femtocell 112 and/or AP 114 may handle a call and/or communication session with a specified UE 116.

The memory 194 may comprise suitable logic, circuitry, and/or code that may enable storage or programming of information that includes, for example, parameters and/or code that may effectuate the operation of the hybrid network controller 110. Exemplary parameters may comprise configuration data and exemplary code may comprise operational code such as software and/or firmware, but the information need not be limited in this regard. Moreover, the parameters may comprise adaptive filter and/or block coefficients. Additionally, the memory 194 may buffer or otherwise store received data and/or data to be transmitted. In various embodiments of the invention, the memory 192 may comprise QoS and/or control parameters for traffic managed by the hybrid network controller 110. In addition, one or more look-up tables which may be utilized for determining which of the UEs 116 within a coverage area of the femtocells 112 and/or the APs 114 may be stored in the memory 194.

The DSP 196 may comprise suitable logic, circuitry, and/or code that may be operable to perform computationally intensive processing of data. The DSP 196 may be operable to handle exemplary operations comprising encoding, decoding, modulating, demodulating, encryption, decryption, scrambling, descrambling, and/or otherwise processing of data. For example, in instances when the hybrid network controller 110 may communicate with a femtocell, the DSP 196, processor 192 and/or memory 124 may perform physical layer functions such as encoding and/or decoding, as well as OSI layer two and/or layer three functionality. Alternatively, the hybrid network controller 110 may communicate with an access point based on IP protocol. The DSP 196 may be enabled to adjust a modulation scheme, error coding scheme, and/or data rates of transmitted signals.

In operation, the hybrid network controller 110 may communicate with one or more of the femtocells 112, APs 114 and/or UEs 116 via the wired Tx/Rx 184 and/or the wireless broadband Tx/Rx 186 and wired and/or via the wireless links 108. In this regard, the hybrid network controller 110 may receive information from the femtocells 112, APs 114 and/or UEs 116 regarding various operating conditions. Exemplary operating conditions may comprise device capabilities, round trip path delay, received signal strength, measured interference, configuration parameters, antenna beam forming patterns, bit error rates, available bandwidth, timing and/or location information. In various embodiments of the invention, global navigation satellite system (GNSS) timing and/or location coordinates may be provided. In addition, device capabilities such as antenna types, available communication standards, hardware configuration, software configuration, maximum transmit power, and/or battery strength for example. In this regard, information received from the femtocells 112, APs 114 and/or UEs 116 may be utilized to determine new operating parameters and/or how to assign new calls and/or communication sessions.

One or more of the processor 192, the memory 194 and the DSP 196 within the hybrid network controller 110 may be operable to implement a femtocell stack that supports communication with the femtocells 112 and other femtocell communication functions. The hybrid network controller 110 may communicate various control and/or resource allocation information to the femtocells 112, APs 114 and/or UEs 116. For example, beamforming information, frequency assignments, transmission time slot assignments and/or PN code assignments may be communicated. The hybrid network controller 110 may send and/or receive information to and/or from a service provider so that the service provider may also manage various aspects of communication by the femtocells 112, APs 114 and/or UEs 116

The hybrid network controller 110 may receive requests for establishing a call and/or session between en endpoint device 116 and a remote device or to another endpoint device within the hybrid sub-network 118. The hybrid network controller 110 may receive control information from a cellular service provider. The hybrid network controller 110 may receive measurements and/or status information from the femtocells 112, APs 114 and/or UEs 116. The hybrid network controller 110 may determine which femtocells 112 and/or APs 114 may handle the call and/or communication session. In this regard, the femtocell 110 may assign and/or limit frequencies, beamforming parameters, transmission time slots and/or PN codes for example. The hybrid network controller 110 may communicate control information to the femtocell(s) 112 and/or AP(s) 114 that may be selected to handle the call and/or communication session. During the call and/or communication session, the hybrid network controller 110 and the selected femtocell(s) 112 and/or AP(s) 114 may exchange additional control and/or status information.

FIG. 1D is a block diagram of an exemplary femtocell, in accordance with an embodiment of the invention. Referring to FIG. 1D, there is shown a femtocell 112 comprising an antenna 152, a cellular transmitter and/or receiver (Tx/Rx) 154, a wired and/or a wireless broadband transmitter and/or receiver (Tx/Rx) 156, a processor 158, a memory 160, a digital signal processor (DSP) 162, a global navigation satellite system (GNSS) receiver 168 and a GNSS antenna 136. The femtocell 112 may be similar to or the same as the femtocells 112 described with respect to FIG. 1A and/or FIG. 1B.

The GNSS receiver 168 and GNSS antenna 136 comprise suitable logic, circuitry and/or code to receive signals from one or more GNSS satellites, for example, GPS satellites. The received signals may comprise timing, ephemeris, long term orbit information, and/or almanac information that enable the GNSS receiver 168 to determine its location and/or time.

The antenna 152 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception. In various embodiments of the invention, the antenna 152 may comprise suitable logic circuitry and/or code to perform beamforming. For example, the antenna 152 may be a smart antenna and/or may comprise a multiple input, multiple output (MIMO) antenna system. In this regard, the antenna 152 may be operable to configure or adapt a radiation patterns, for example, towards one or more specified UE 116 devices and to null the radiation pattern in other directions. For example, beamforming may be utilized by the femtocells 112 to improve SNR and/or to balance UE 116 traffic among the various femtocells 112 and/or APs 114.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform exemplary operations and/or functions comprising amplification, up-conversion, filtering, modulation and/or digital to analog conversion of transmitted cellular signals. The cellular Tx/Rx 154 may be operable to support communication over a plurality of communication channels utilizing time division multiple access (TDMA) and/or code division multiple access (CDMA) for example. In addition, exemplary cellular standards supported by the femtocells 112 may be specified in the International Mobile Telecommunications-2000 (IMT-2000) standard and/or developed by the $3^{rd}$ generation partnership project (3GPP), the $3^{rd}$ generation partnership project 2 (3GPP2) and/or fourth generation specifications. In addition, $4^{th}$ generation standards, for example, LTE may be supported by the cellular Tx/Rx 154. In various embodiments of the invention, the cellular Tx/Rx 154 may be enabled to measure received signal strength and may adjust a power level and/or a modulation scheme or level of transmitted signals.

The wired and/or wireless broadband Tx/Rx 156 may comprise suitable logic, circuitry, and/or code that may be operable to transmit voice and/or data in adherence to one or more broadband communication standards. The broadband Tx/Rx 156 may be operable to perform exemplary functions or operations comprising amplification, down-conversion, filtering, demodulation and/or analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data to and/or from the hybrid network controller 110 over the wired connection 108*a* and/or over the wireless connection 108*c* via the antenna 152.

The processor 158 may comprise suitable logic, circuitry, and/or code that may enable processing data and/or controlling operations of the femtocell 112. In this regard, the processor 158 may be enabled to provide control signals to the various other blocks within the femtocell 112, for example the DSP 162, memory 160 and/or Tx/Rx 154. The processor 158 may also control data transfers between various portions of the femtocell 112. Additionally, the processor 158 may enable execution of applications programs and/or code. In various embodiments of the invention, the applications, programs, and/or code may enable, for example, parsing, transcoding and/or otherwise processing data.

In various embodiments of the invention, the applications, programs, and/or code may enable, for example, configuring or controlling operation of the antenna 152, cellular transmitter and/or receiver 154, the broadband transmitter and/or receiver 156, the GNSS receiver 168, the DSP 162, and/or the memory 160. The processor 158 may receive control information from the hybrid network controller 110. In this regard, the processor 158 may be enabled to provide one or more signals to the cellular Tx/Rx 154, the memory 160, and/or the DSP 162 to control communication between the femtocell 112 and the UE 116. In addition, the processor 158 may control exemplary parameters comprising frequency, transmission time, PN code, antenna radiation pattern power level, modulation scheme, error coding scheme, and/or data rates of transmitted cellular signals.

The memory 160 may comprise suitable logic, circuitry, and/or code that may enable storage or programming of information that includes parameters and/or code that may effectuate the operation of the femtocell 112. A portion of the programming information and/or parameters may be received from the hybrid network controller 110. The parameters may comprise configuration data and the code may comprise operational code such as software and/or firmware, but the information need not be limited in this regard. Moreover, the parameters may comprise adaptive filter and/or block coefficients, frequencies, transmission time, PN codes and/or antenna radiation patterns for example. The memory 160 may be operable to buffer or otherwise store received data and/or data to be transmitted. In various embodiments of the invention, the memory 160 may comprise one or more look-up tables which may be utilized for determining cellular devices that may be within a coverage area of the femtocell 112.

The DSP 162 may comprise suitable logic, circuitry, and/or code operable to perform computationally intensive processing of data. The DSP 162 may be operable to encode, decode, modulate, demodulate, encrypt, decrypt, scramble, descramble, and/or otherwise process data. For example, in instances when the femtocell 112 may communicate with a femtocell, the DSP 162, the processor 158 and/or the memory 160 may perform physical layer functions such as encoding and/or decoding, as well as OSI layer two and/or layer three functionality. Alternatively, the femtocell 112 may communicate with an access point based on IP protocol. The DSP 162 may also be enabled to adjust a modulation scheme, error coding scheme, and/or data rates of transmitted cellular signals data. Moreover, one or more of the processor 158, the memory 160 and the DSP 162 may be operable to implement a femtocell stack that supports communication with the femtocells 112 and/or other femtocell communication functions.

In operation, the femtocell 112 may determine signal characteristics such as direction of arrival, interference levels and signal strength of signals received via a cellular communication channel. Similarly, the DSP 162 and/or the processor 156 may determine bit error rates of data received via a cellular communication channel and available bandwidth of the channel. The measurements may be communicated to the hybrid network controller 110 by the Broadband Tx/Rx 156 via the wired connection 108*a* and/or the wireless connection 108*c*. Additionally, the femtocell 112 may receive feedback from a UE 116 on the other end of a cellular communication channel;

that may also be communicated to the hybrid network controller 110 via the broadband Tx/Rx 156.

Network management messages may be received via the broadband Tx/Rx 156 from the hybrid network controller 110. The processor 158 may utilize the received management messages to configure, for example, the cellular Tx/Rx 154, the antenna 152 and/or the DSP 162. In this regard, communication parameters comprising frequency, transmission time, PN codes and radiation pattern for a communication channel between the femtocell 112 and one or more UE 116 may be configured. Additionally, network management messages from the hybrid network controller 110 may be conveyed via the femtocell 112 to the UEs 116.

Figure 1E:
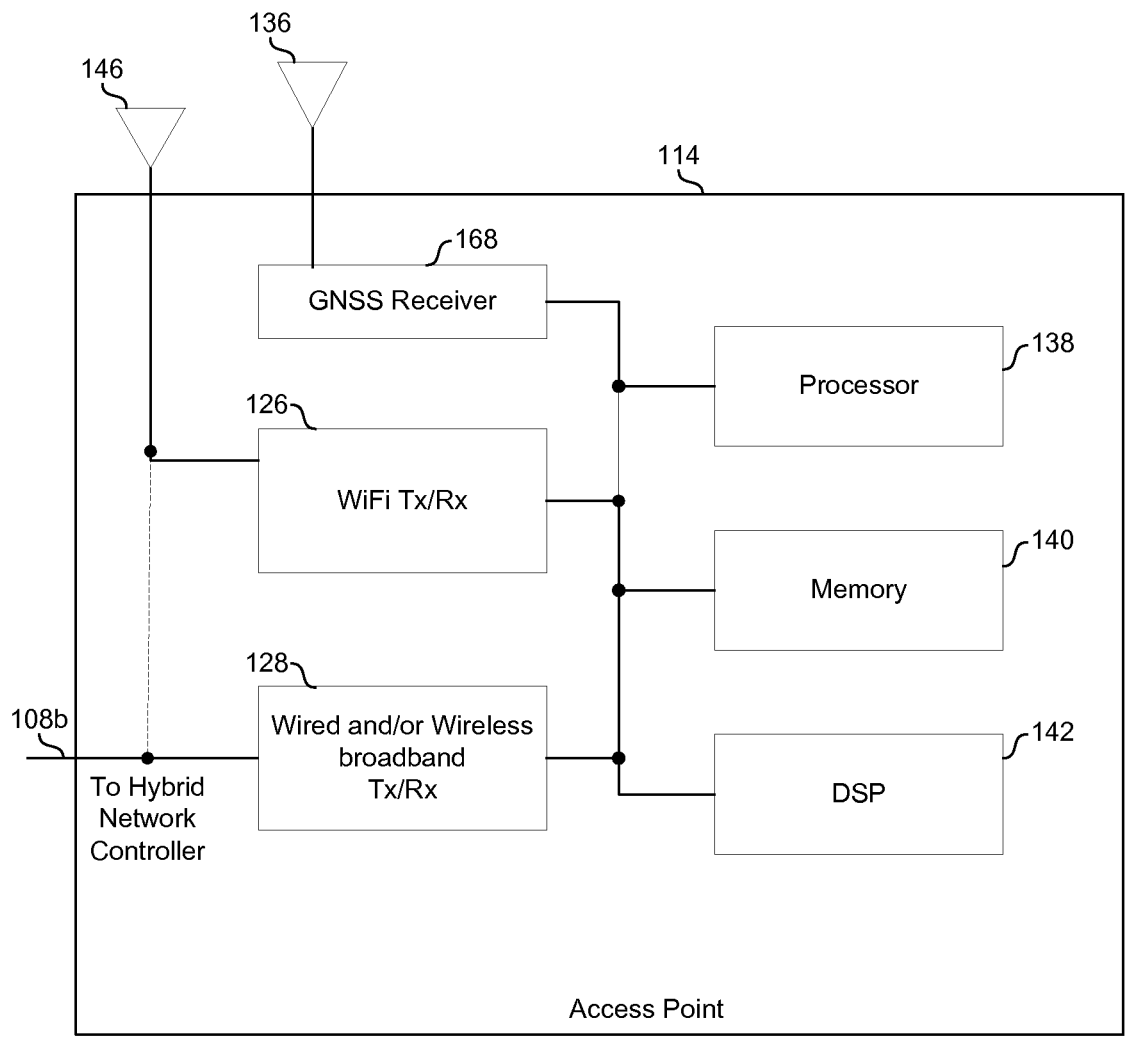
FIG. 1E is a block diagram of an exemplary access point, in accordance with an embodiment of the invention.

FIG. 1E is a block diagram of an exemplary access point, in accordance with an embodiment of the invention. Referring to FIG. 1E, there is shown an AP 114 comprising an antenna 146, a WiFi transmitter and/or receiver (Tx/Rx) 126, a wired and/or a wireless broadband transmitter and/or receiver (Tx/Rx) 128, a processor 138, a memory 140, a digital signal processor (DSP) 142, a global navigation satellite system (GNSS) receiver 168 and a GNSS antenna 136. The AP 114 may be similar to or the same as the APs 114 described with respect to FIG. 1A and/or FIG. 1B.

The GNSS receiver 168 and GNSS antenna 136 may be similar and/or the same as the GNSS receive 168 and GNSS antenna 136 described with respect to FIG. 1D.

The antenna 146 may be suitable for transmitting and/or receiving signals to and/or from the UE 116 and/or to and/or from the hybrid network controller 110. Although a single antenna is illustrated, the invention is not so limited. In this regard, the WiFi Tx/Rx 126 and/or wired and/or wireless broadband Tx/Rx 128 may utilize a common antenna for transmission and reception, may utilize different antennas for transmission and reception, and/or may utilize a plurality of antennas for transmission and/or reception. The antenna 146 may comprise suitable logic circuitry and/or code to perform beamforming. For example, the antenna 146 may be a smart antenna and/or may comprise a MIMO system. In this regard, the antenna 146 may be operable to focus a radiation pattern in a direction of interest, for example, towards one or more specified UE 116 devices and to null the radiation pattern in other directions. Beamforming may be utilized by the APs 114 to improve SNR and/or to balance UE 116 traffic among the various femtocells 112 and/or APs 114.

The WiFi Tx/Rx 126 may be similar to the wired and/or wireless broadband Tx/Rx 184, Tx/Rx 186 and/or the WiMax and/or LTE Tx/Rx 198. In this regard, the WiFi Tx/Rx 126 may be operable to perform the functions described with respect to the Tx/Rx 184, the Tx/Rx 186 and/or the Tx/Rx 198. Moreover, the WiFi Tx/Rx 126 may comprise suitable logic circuitry and/or code that may be operable to transmit and/or receive data to the UEs 116 utilizing 802.11 standards. In various embodiments of the invention, an AP 114 may utilize the same Tx/Rx 126 for communicating with UEs 116 and with the hybrid network controller 110.

The wired and/or wireless broadband Tx/Rx 128 may comprise suitable logic, circuitry, and/or code that may be operable to transmit data in adherence to one or more broadband standards to the hybrid network controller 110 for one or more UE 116. In this regard, the wired and/or wireless broadband Tx/Rx 128 may communicate data to and/or from a plurality of UE 116 to and/or from the hybrid network controller 110. The wired and/or wireless broadband Tx/Rx 128 may be operable to perform exemplary operations and/or functions comprising amplification, down-conversion, filtering, demodulation, and analog to digital conversion of received signals. The wired and/or wireless broadband Tx/Rx 128 may be operable to perform amplification, up-conversion, filtering, modulation, and digital to analog conversion of transmitted signals. In various exemplary embodiments of the invention, the wired and/or wireless broadband Tx/Rx 128 may transmit and/or receive data over the wired connection 108b and/or over the wireless connection 108d via the antenna 146. In various embodiments of the invention, an AP 114 may utilize the same Tx/Rx 128 for communicating with the UE 112 and with the hybrid network controller 110.

The processor 138 may comprise suitable logic, circuitry, and/or code that may enable processing data and/or controlling operations of the AP 114. In this regard, the processor 138 may be enabled to provide control signals to the various other blocks comprising the AP 114. The processor 138 may also control data transfers between various portions of the AP 114. Additionally, the processor 138 may enable execution of applications programs and/or code. The applications, programs, and/or code may enable, for example, parsing, transcoding, or otherwise processing data. In addition, the applications, programs, and/or code may enable, for example, configuring or controlling operation of the WiFi Tx/Rx 126, the antenna 146, the broadband Tx/Rx 128, the GNSS receiver 168, the DSP 142, and/or the memory 140. The processor 138 may receive control information from the hybrid network controller 110. In this regard, the processor 138 may be enabled to provide one or more control signals to the WiFi Tx/Rx 126, the antenna 146, the wired and/or wireless broadband Tx/Rx 128, the memory 140, and/or the DSP 142 to control communication between the AP 114 and the UE 116. In addition, the processor 138 may control parameters such as frequency, transmission time, PN code, antenna radiation pattern, power level, modulation scheme, error coding scheme, and/or data rates of transmitted WiFi signals.

The memory 140 may comprise suitable logic, circuitry, and/or code that may enable storage or programming of information that includes parameters and/or code that may effectuate the operation of the AP 114. A portion of the programming information and/or parameters may be received from the hybrid network controller 110. Parameters may comprise configuration data and the code may comprise operational code such as software and/or firmware, but the information need not be limited in this regard. Moreover, the parameters may include adaptive filter and/or block coefficients. Additionally, the memory 140 may buffer or otherwise store received data and/or data to be transmitted. In various embodiments of the invention, the memory 140 may comprise one or more look-up tables which may be utilized for determining WiFi access within a coverage area of the AP 114.

The DSP 142 may comprise suitable logic, circuitry, and/or code operable to perform computationally intensive processing of data. In various embodiments of the invention, the DSP 142 may encode, decode, modulate, demodulate, encrypt, decrypt, scramble, descramble, and/or otherwise process data. The DSP 142 may be enabled to adjust a modulation scheme, error coding scheme, and/or data rates of transmitted WiFi signal data.

In operation, the WiFi Tx/Rx 126 may determine characteristics such as interference levels and signal strength of desired signals received via a WiFi communication channel. Similarly, the DSP 142 and/or the processor 138 may determine bit error rates of data received via a WiFi communication channel and available bandwidth of the channel. The measurements may be communicated to the hybrid network controller 110 by the broadband Tx/Rx 128 via the wired connection 108b and/or the wireless connection 108d. Additionally, the AP 114 may receive feedback from a UE 116 via the WiFi link 120a that may also be communicated to the hybrid network controller 110 by the wired and/or wireless broadband Tx/Rx 128.

The broadband Tx/Rx 128 may also receive network management messages from the hybrid network controller 110. The processor 138 may utilize the received management messages to configure the WiFi Tx/Rx 126, the antenna 146 and/or the DSP 142 to control parameters of a WiFi communication channel to the UE 116. For example, frequency, transmission time, PN code, antenna radiation pattern, transmission power levels and/or error coding scheme may be configured for example. Additionally, management messages from the hybrid network controller 110 may be communicated to the UE 116 via the WiFi Tx/Rx 126.

Figure 1F:
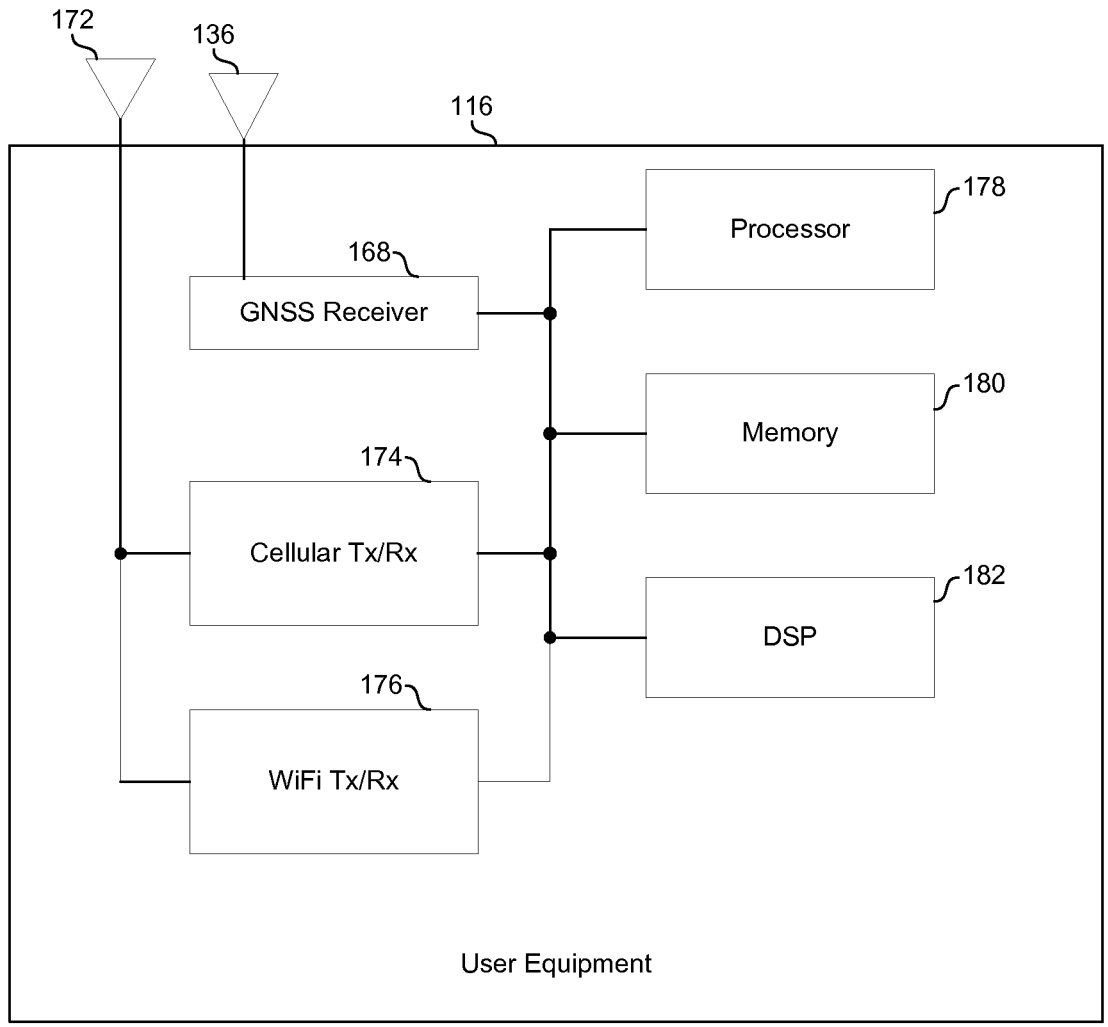
FIG. 1F is a block diagram of exemplary user equipment, in accordance with an embodiment of the invention.

FIG. 1F is a block diagram of exemplary user equipment, in accordance with an embodiment of the invention. The UE 116 may comprise a cellular Tx/Rx 174, a WiFi Tx/Rx 176, an antenna 172, a global navigation satellite system (GNSS) receiver 168, a GNSS antenna 136, a processor 178, a memory 180, and a DSP 182. The UE 116 may be similar or the same as one or more of the UE 116a, . . . , 116g described with respect to FIGS. 1A and/or 1B. The GNSS receiver 168 and GNSS antenna 136 may be similar or the same as the GNSS receiver 168 and GNSS antenna 136 described with respect to FIG. 1D.

The antenna 172 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception. In various embodiments of the invention, the antenna 172 may be operable to perform beamforming and/or may comprise a MIMO or virtual MIMO antenna system for example.

The cellular Tx/Rx 174 may be similar to or the same as the cellular Tx/Rx 154 described with respect to FIG. 1D. The cellular Tx/Rx 174 may enable communication between a UE 116 and one or more femtocells 112. The cellular Tx/Rx 174 may be operable to communicate based on a wireless voice and/or data communication standard, for example, 3GPP, 3GPP2, LTE and/or WIMAX. Although the UE 116 shown in FIG. 1F comprises two Tx/Rx units, for cellular and WiFi, the UE 116 is not limited in this regard. For example, the UE 116 may be a multi-mode device that may comprise a plurality of Tx/Rx units and may be operable to communicate based on a plurality of wireless voice and/or data communication standards for example, 3GPP, 3GPP2, LTE, WIMAX, 802.11, Bluetooth and Zigbee.

The WiFi Tx/Rx 176 may be similar and/or the same as the WiFi Tx/Rx described with respect to FIG. 1E. The WiFi Tx/Rx 176 may enable communication between a UE 116 and one or more APs 114.

The processor 178 may comprise suitable logic, circuitry, and/or code that may enable processing data and/or controlling operations of the UE 116. In this regard, the processor 178 may be enabled to provide control signals to the various other blocks within the UE 116. The processor 178 may also control data transfers between various portions of the UE 116. Additionally, the processor 178 may enable execution of applications programs and/or code. The applications, programs, and/or code may enable processing data. In addition, the applications, programs, and/or code may enable, for example, configuring or controlling operation of the cellular Tx/Rx 174, the antenna 172, the GNSS receiver 168, the WiFi Tx/Rx 176, the DSP 182, and/or the memory 180. The processor 178 may receive control information from the hybrid network controller 110. In this regard, the processor 178 may be enabled to provide one or more signals to the cellular Tx/Rx 174, the WiFi Tx/Rx 176, the memory 180, and/or the DSP 182 to control communication between the UE 116 and the femtocell 112 or the AP 114. In addition, the processor 178 may control parameters such as frequency, transmission time, PN code, antenna radiation pattern, power level, modulation scheme, error coding scheme, and/or data rates of transmitted cellular and/or WiFi signals.

The memory 180 may comprise suitable logic, circuitry, and/or code that may enable storage or programming of information that includes parameters and/or code that may effectuate the operation of the UE 116. A portion of the programming information and/or parameters may be received from the hybrid network controller 110. Parameters may comprise configuration data and the code may comprise operational code such as software and/or firmware, but the information need not be limited in this regard. Moreover, the parameters may include adaptive filter and/or block coefficients, frequency, transmission time, PN code. Additionally, the memory 180 may buffer or otherwise store received data and/or data to be transmitted. The memory 180 may comprise one or more look-up tables which may be utilized to determine which femtocells 112 and/or APs 114 are within a range of the UEs 116.

The DSP 182 may comprise suitable logic, circuitry, and/or code operable to perform computationally intensive processing of data. The DSP 182 may be operable to encode, decode, modulate, demodulate, encrypt, decrypt, scramble, descramble, and/or otherwise process data. The DSP 182 may be enabled to adjust a modulation scheme, error coding scheme, and/or data rates of transmitted cellular and/or WiFi signal data.

In operation, the UE 116 may be a multimode wireless device and may comprise a plurality of wireless transmitters and/or receivers (Tx/Rx). For example, the UE 116 may be operable to transmit and/or receive signals to and/or from one or more of the femtocells 112 and/or the APs 114 that may utilize different wireless communication standards. The cellular Tx/Rx 174 and/or WiFi Tx/Rx 176 may be operable to determine signal characteristics comprising interference levels and signal strength of signals received via a cellular and/or WiFi communication channel. Similarly, the DSP 182 and/or the processor 156 may be operable to determine bit error rates of data received via a cellular communication channel and available bandwidth of the channel. Information, for example, measurements and/or status, from the Tx/Rx 174, the Tx/Rx 176, the GNSS receiver 168, the memory 160, the processor 178 and/or the DSP 182 may be communicated to the hybrid network controller 110, the femtocell 112 and/or the AP 114. Additionally, the UE 116 may receive control information and/or parameters from hybrid network controller 110 via the femtocell 112 and/or the AP 114. For example, control messages from the hybrid network controller 110 may be received by the UE 116 via the cellular Tx/Rx 174 and/or the WiFi Tx/Rx 176. The processor 178 may utilize the received control information to configure the UE 116 and/or to manage call and/or session set up and/or call and/or session processing. For example, the hybrid network controller 110 may be operable to control communication parameters for frequency, time slot, PN code, antenna pattern, power level, error coding scheme, data rate and/or modulation scheme.

Figure 2:
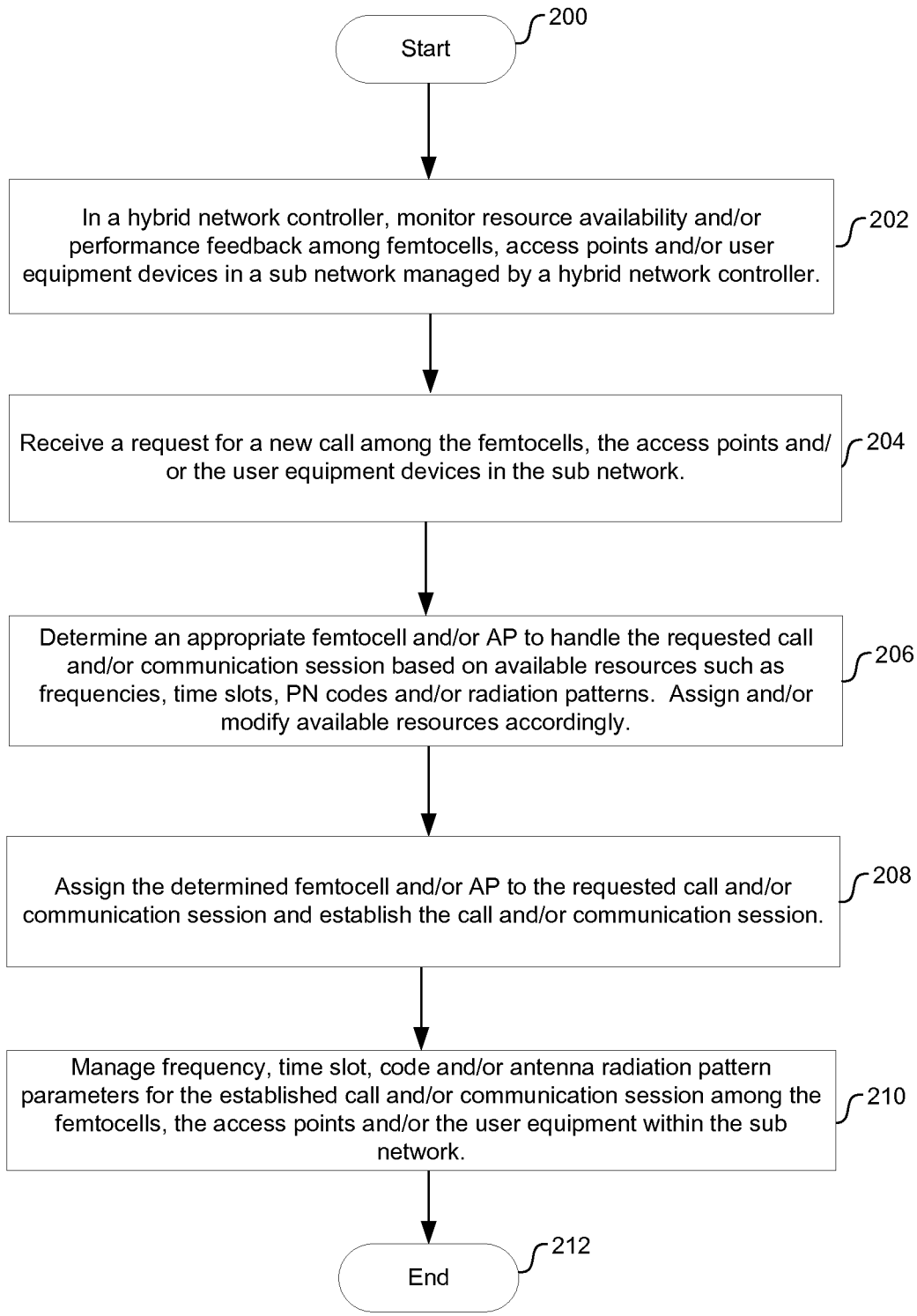
FIG. 2 is a flowchart illustrating exemplary steps for multidimensional resource management in a hybrid sub-network comprising femtocells and/or access points by a hybrid network controller, in accordance with an embodiment of the invention.

FIG. 2 is a flowchart illustrating exemplary steps for multidimensional resource management in a hybrid sub-network comprising femtocells and/or access points by a hybrid network controller, in accordance with an embodiment of the invention. Referring to FIG. 2, the exemplary steps may begin with start step 200. In step 202, the hybrid network controller 110 may monitor performance feedback and/or availability of resources comprising frequencies, time slots, PN codes and/or radiation patterns among the femtocells 112, the access points 114 and/or the user equipment devices 116 in the hybrid sub-network 118 managed by a hybrid network controller 110. In step 204, a request is received for a new call and/or a new communication session among the femtocells 112, the access points 114 and/or the user equipment devices 116 in the hybrid sub-network 118. In step 206, an appropriate femtocell 112 and/or AP 114 may be determined to handle the requested call and/or communication session based on available resources such as frequencies, time slots, PN codes and/or radiation patterns. The resources may be assigned and/or modified. In step 208, the determined femtocell 112 and/or AP 114 may be assigned to the requested call and/or communication session and the call and/or communication session may be established. In step 210, frequency, time slot, code and/or antenna radiation pattern parameters may be managed during the established call and/or communication session among the femtocells 112, the access points 114 and/or the user equipment 116 within the hybrid sub-network 118. The exemplary steps may end with step 212.

In various embodiments of the invention, a communication system, for example, the hybrid sub-network 118 may comprise a hybrid network controller 110, one or more femtocells 112, one or more access points 114 and/or one or more end-point devices 116. The hybrid network controller 110 may be operable to determine configuration parameters corresponding to space, time, frequency and/or code domains that may enable communication of data between and/or among two or more of the femtocells 112, the access points 114 and/or the end-point devices 116. In addition, the hybrid network controller 110 may be enabled to communicate the determined configuration parameters to the femtocells 112, the access points 114 and/or the end-point devices 116 for the enabling of the communication. The configuration parameters corresponding to the space, time, frequency and/or code domains may comprise one or more of frequency assignments, time slot assignments, code assignments and/or antenna pattern assignments for example. Moreover, the hybrid network controller 110 may be operable to control the communication of the data between a communication device external to the communication system 118, for example, the laptop 124b and the one or more femtocells 112, the one or more access points 114 and/or the one or more end-point devices 116. Availability of frequencies, time slots, codes and/or antenna patterns of the one or more femtocells 112, the one or more access points 114 and/or the one or more end-point devices 116 may be monitored by the hybrid network controller 110. The hybrid network controller 110 may allocate and/or assign one or more frequencies, one or more time slots, one or more codes and/or one or more antenna patterns for the communication of the data, based on the configuration parameters. Moreover, the hybrid network controller 110 may assign one or more of the femtocells 112, the access points 114 and/or the end-point devices 116 to handle the communication of the data. The hybrid network controller 110 may communicate information for controlling the communication parameters with the femtocells 112, the access points 114 and/or the end-point devices 116 via one or more of wired, optical and/or wireless interfaces, for example, the wired broadband Tx/Rx 184, the wireless broadband Tx/Rx 186, the Ethernet Tx/Rx 188 and/or the WiMax and/or LTE Tx/Rx 198.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for multi-dimensional resource management in a wireless network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for multi-dimensional resource management by a hybrid network controller to a local sub-network, the hybrid network controller having a plurality of transceivers configured to communicate with a femtocell, a Wireless Local Area Network (WLAN)-based access point, and at least one endpoint device of the local sub-network, the method comprising:

determining multi-dimensional configuration parameters based on available resources including one or more of space, time, frequency and code domains that enable wireless communication of data with the femtocell, the WLAN-based access point, and the at least one endpoint device of the local sub-network;

communicating the multi-dimensional configuration parameters via respective transceivers of the plurality of transceivers to configure the femtocell, the WLAN-based access point, and the at least one endpoint device of the local sub-network for the wireless communication of data based on user equipment traffic constraints of the at least one endpoint device;

balancing user equipment traffic of the at least one endpoint device responsive to dynamic conditions of the user equipment traffic based upon the multi-dimensional configuration parameters; and allocating and assigning one or more antenna patterns for the wireless communication of the data based on the multi-dimensional configuration parameters to improve signal quality for at least one of the femtocell and the WLAN-based access point.

2. The method of claim 1, wherein the multi-dimensional configuration parameters include one or more of frequency assignments, time slot assignments, code assignments and antenna pattern assignments.

3. The method of claim 1, further comprising:
controlling communication of the data between a communication device external to the local sub-network and the femtocell, the WLAN-based access point, and the at least one endpoint device of the local sub-network.

4. The method of claim 1, further comprising:
monitoring one or more of availability of frequencies, time slots, codes and antenna patterns of one or more of the femtocell, the WLAN-based access point, and the at least one endpoint device of the local sub-network to dynamically configure the femtocell, the WLAN-based access point, and the at least one endpoint device of the local sub-network to balance the wireless communication of data.

5. The method of claim 1, further comprising:
allocating and assigning one or more frequencies for the communication of the data based on the multi-dimensional configuration parameters.

6. The method of claim 1, further comprising:
allocating and assigning one or more codes for the communication of the data based on the multi-dimensional configuration parameters.

7. The method of claim 1, further comprising:
assigning one or more of the femtocell, the WLAN-based access point, and the at least one endpoint device to handle the communication of the data based upon the multi-dimensional configuration parameters.

8. The method of claim 1, further comprising:
communicating with one or more of the femtocell, the WLAN-based access point, and the at least one endpoint device of the local sub-network, information for controlling the communication parameters via one or more of wired, optical and wireless interfaces.

9. A hybrid network controller in a local sub-network of a wireless communication system including a femtocell, an access point, and at least one endpoint device, the hybrid network controller configured to:
determine multi-dimensional configuration parameters based on available resources including one or more of space, time, frequency and code domains that enable wireless communication of data with the femtocell, the WLAN-based access point, and the at least one endpoint device of the local sub-network;
communicate the multi-dimensional configuration parameters via respective transceivers of the plurality of transceivers to configure the femtocell, the WLAN-based access point, and the at least one endpoint device of the local sub-network for the wireless communication of data based on user equipment traffic constraints of the at least one endpoint device;
balance user equipment traffic of the at least one endpoint device responsive to dynamic conditions of the user equipment traffic based upon the multi-dimensional configuration parameters; and
allocate and assign one or more antenna patterns for the wireless communication of the data, based on the multi-dimensional configuration parameters.

10. The hybrid network controller of claim 9, wherein the multi-dimensional configuration parameters include one or more of frequency assignments, time slot assignments, code assignments and antenna pattern assignments.

11. The hybrid network controller of claim 9, further configured to control communication of the data between a communication device external to the local sub-network and the femtocell, the access point, and the at least one endpoint device.

12. The hybrid network controller of claim 9, further configured to monitor one or more of availability of frequencies, time slots, codes and antenna patterns of one or more of the femtocell, the access point, and the at least one endpoint device.

13. The hybrid network controller of claim 9, further configured to allocate and assign one or more frequencies for the communication of the data, based on the multi-dimensional configuration parameters.

14. The hybrid network controller of claim 9, further configured to allocate and assign one or more time slots for the communication of the data, based on the multi-dimensional configuration parameters.

15. The hybrid network controller of claim 9, further configured to allocate and assign one or more codes for the communication of the data, based on the multi-dimensional configuration parameters.

16. The hybrid network controller of claim 9, further configured to assign one or more of the femtocell, the access point, and the at least one endpoint device to handle the communication of the data.

17. The hybrid network controller of claim 9, further configured to communicate with one or more of the femtocell, the access point, and the at least one endpoint device, information for control of communication parameters via one or more of wired, optical and wireless interfaces.

18. A method for multi-dimensional resource management by a hybrid network controller to a local sub-network, the hybrid network controller having a plurality of transceivers configured to communicate with a service area including a femtocell, a Wireless Local Area Network (WLAN)-based access point, and at least one endpoint device of the local sub-network, the method comprising:
determining multi-dimensional configuration parameters based on available resources including one or more of space, time, frequency and code domains that enable wireless communication of data with the femtocell, the WLAN-based access point, and the at least one endpoint device of the local sub-network;
communicating the determined multi-dimensional configuration parameters via respective transceivers of the plurality of transceivers to configure the femtocell, the WLAN-based access point, and the at least one endpoint device of the local sub-network for the wireless communication of data based on user equipment traffic constraints of the at least one endpoint device;
balancing user equipment traffic of the at least one endpoint device responsive to dynamic conditions of the user equipment traffic based upon the determined multi-dimensional configuration parameters; and
modifying antenna radiation patterns to improve signal quality and shape the service area based upon the determined multi-dimensional configuration parameters.

19. The method of claim 18, wherein the determined multi-dimensional configuration parameters include one or more of frequency assignments, time slot assignments, code assignments and antenna pattern assignments.

20. The method of claim 18, further comprising:
allocating and assigning one or more frequencies for the wireless communication of the data based on the determined multi-dimensional configuration parameters.

* * * * *